United States Patent [19]
Shtipelman et al.

[11] Patent Number: 5,598,386
[45] Date of Patent: Jan. 28, 1997

[54] OPTIMIZED LINEAR MOTORS FOR FOCUS/TRACKING ACTUATORS IN OPTICAL DISK DRIVES

[75] Inventors: Boris A. Shtipelman, Rochester; James A. Barnard, Scottsville, both of N.Y.

[73] Assignee: Eastman Kodak Company, Rochester, N.Y.

[21] Appl. No.: 376,567

[22] Filed: Jan. 23, 1995

[51] Int. Cl.$^6$ .................................................. G11B 7/09
[52] U.S. Cl. ................................... 369/44.14; 369/44.16; 359/823
[58] Field of Search ......................... 369/44.11, 44.14, 369/44.15, 44.16, 44.21, 44.22; 359/823, 824; 310/12, 40 MM

[56] References Cited

U.S. PATENT DOCUMENTS

| | | | |
|---|---|---|---|
| 4,782,476 | 11/1988 | Sekimoto et al. | 369/45 |
| 4,813,033 | 3/1989 | Baasch et al. | 369/44.16 |
| 4,822,139 | 4/1989 | Yoshizumi | 350/257 |
| 5,097,456 | 3/1992 | Tanoshima et al. | 369/44.15 |
| 5,140,471 | 8/1992 | Kasahara | 359/824 |
| 5,218,587 | 6/1993 | Nomiyama et al. | 369/44.16 |
| 5,265,079 | 11/1993 | Getreuer et al. | 369/44.21 X |
| 5,428,589 | 6/1995 | Shtipelman | 369/44.15 |

*Primary Examiner*—Thang V. Tran
*Attorney, Agent, or Firm*—Peter J. Bilinski

[57] ABSTRACT

A focus/tracking actuator for controlling the respective focus and tracking positions of a lens used to direct a focused beam of radiation onto a desired data track on a moving recording element comprises a pair of moving coil-type linear motors. Each of the motors comprises a coil of wire disposed in a magnetic air gap and adapted to move therein in response to an applied current flow. According to the invention, the respective masses of the motor coils are optimized to achieve maximum acceleration with minimum power comsumption. Preferably, the coils have a combined mass substantially equal to the mass of the moving payload, which includes the lens assembly and its movable support.

6 Claims, 6 Drawing Sheets

FIG. 1

(PRIOR ART)

FIG. 2

(PRIOR ART)

OPTIMIZED LINEAR MOTORS FOR FOCUS/TRACKING ACTUATORS IN OPTICAL DISK DRIVES

BACKGROUND OF THE INVENTION

1. Field of the Invention

The present invention relates to the fields of optical and magnetooptical recording. More particularly, it relates to improvements in moving coil linear motors of the type commonly used in optical and magnetooptical recording/playback apparatus to control the focus and tracking position of an objective lens used to direct a read/write beam onto a moving recording medium, such as an optical or magnetooptical disk.

2. Discussion of the Prior Art

Figure 1:
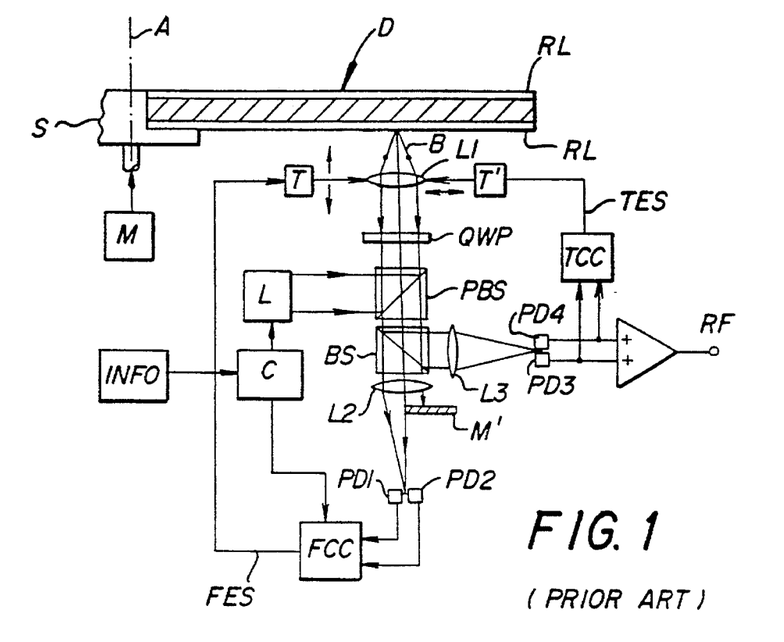
FIG. 1 is a schematic illustration of a conventional focus/tracking actuator.

In the fields of optical and magneto-optical recording, as illustrated in FIG. 1, a beam of radiation B, as emitted by a diode laser L or the like, is focused on the recording layer RL of an optical or magneto-optical disk D by a lens L1. The disk is supported by a spindle S which, in turn, is rotated about its axis A by a motor M. In a data recording mode, the laser output is intensity-modulated by a controller C which responds to a signal representing data to be recorded. In a playback mode, the data recorded on the disk serves to intensity modulate the reflected laser beam. In an optical recording system, the laser output is transmitted to the disk through the combination of a polarizing beam-splitter PBS and quarter wave plate QWP. These elements cooperate in a well known manner to optically isolate the laser cavity from radiation reflected from the disk. Upon being reflected from the disk, the laser beam is divided by a beam splitter BS. One portion of the beam is focused by a lens L2 onto either of a pair of spaced photodetectors, PD1 and PD2. A mask M' blocks half of the aperture of lens L2, and the focal distance between lens L1 and the disk determines which of the two photodetectors receives the more reflected light. The respective outputs of PD1 and PD2 are processed by a focus control circuit FCC which, in turn, produces a focus error signal FES. A focus actuator or transducer T responds to the focus error signal to adjust the position of lens L1 toward or away from the disk in order to maintain proper focus. Similarly, the other portion of the beam divided by the beam splitter is focused onto a pair of photodetectord PD3 and PD4. The respective outputs of PD3 and PD4 are summed to provide the data signal RF, and the respective outputs of PD3 and PD4 are differenced by a tracking control circuit TCC to produce a tracking error signal TES representing the displacement of the beam focused on the disk relative to a desired data track. A tracking actuator or transducer T' responds to the tracking error signal to adjust the position of lens L1 in a plane parallel to the disk, thereby moving the focused beam in a radial direction on the disk in order to maintain the focused spot centered on a desired track. Optical arrangements of the type shown in FIG. 1 are well known and can be seen, for example, in the disclosure of the commonly assigned U.S. Pat. No. 4,967,404.

Moving coil linear motors are widely used today in optical and magnetooptical disk drives to control both the focus and radial (tracking) position of the objective lens L1 as described above and shown in FIG. 1. Usually, such motors are relatively tiny in order to fit into those "tight" spaces of the disk drive where "real estate" is always limited. Small as they are, these motors must develop a significant amount of force so that adequate acceleration of the moving parts or payload can be achieved. The required acceleration determines the amount of electrical power, both average and peak, which must be provided without overheating the coils. Additionaly, the design of linear motors for disk drives must be correlated with the overall structure of the mechanism so that the motor's dynamic performance does not result in resonances within the required range of operating frequencies, a requirement related to the necessity to successfully control motion of the moving parts.

Figure 2:
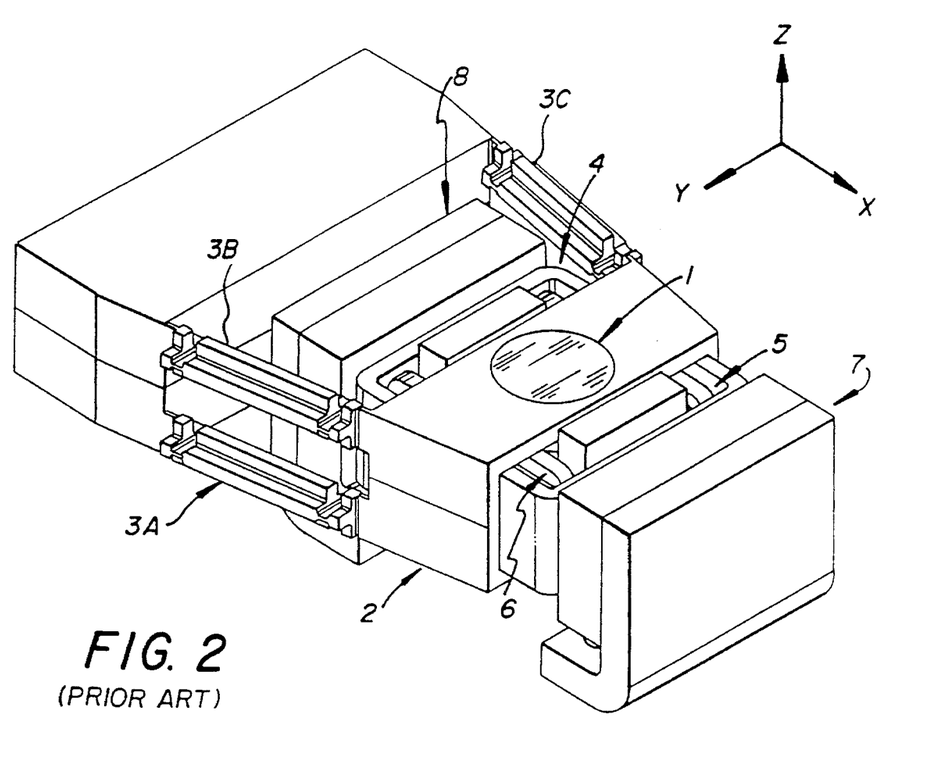
FIGS. 2 and 3 are perspective and exploded illustrations of a conventional focus/tracking actuator.
Figure 3:
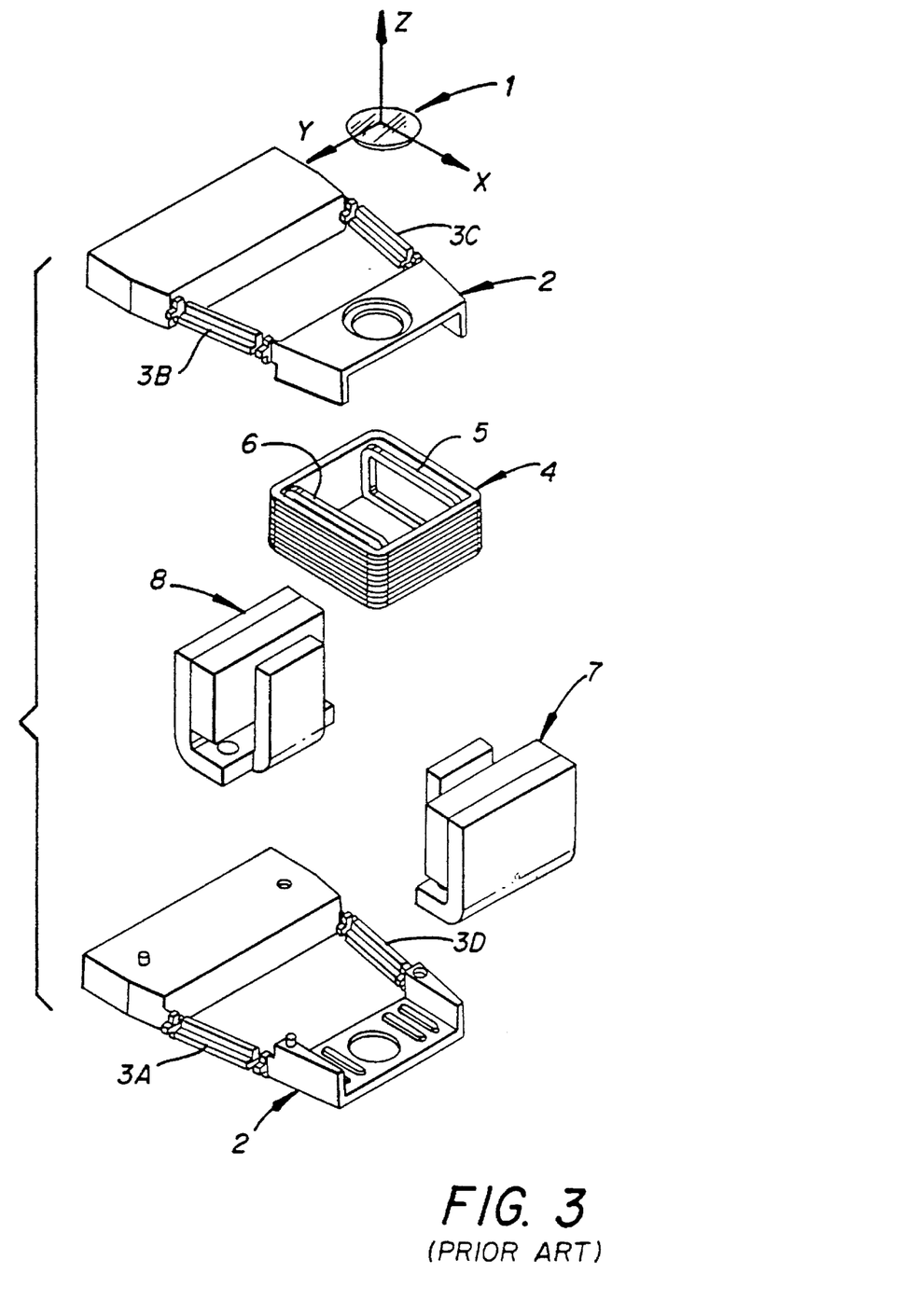

In designing linear motors, specified requirements are fulfilled by choosing proper geometric parameters. Among them, most attention must be paid to coil sizing and defining the motor's magnetic structure. These two factors are especially important since their optimization results in minimization of the amount of required power which, in turn, minimizes the temperature rise of motor coils. In radial acces mechanisms of optical and magnetooptical disk drives, the position of the read/write head need only be controlled in one direction, that being along the radial direction of the disk. With a singular motor being utilized, the design optimization is carried out by solving the motor/load matching problem. For drives with symmetrical velocity profiles, an optimized motor design requires that the coil mass to be equal to the payload mass. Coil masses of motors with unsymmetrical velocity profiles must be defined depending upon the so-called normalized cycle time of the disk drive. In general terms, the same relationship between coil and payload masses can be maintained in designing lens actuators for optical disk drives. In such cases, however, the objective lens requires motions in two mutually perpendicular directions, one motion being towards and away from the disk (for focus), and the other motion being in a plane parallel to the disk (for fine tracking). The need for these two motions necessitates the use of two discrete motors. Usually, separate coils for these two motors, as being located in the same air gap, are penetrated by the magnetic flux of a common permanent magnet. Such a design is illustrated in FIG. 2 where a four-bar focus/tracking actuator is illustrated. An exploded view of the same actuator is shown in FIG. 3. As shown, an objective lens 1 is located in a lens holder 2 which is suspended by four flexible bars 3A–3D. Lens motion in either the focus (along the Z axis) or tracking (along the Y axis) directions is achieved by employing two linear motors. Both linear motors are of the moving coil type, the motor which controls the focus position of the lens comprising focus coil 4, and the motor which controls the tracking position of the lens comprising tracking coils 5 and 6. These coils are located within air gaps defined by the spaced magnetic structures 7 and 8. The four-bar focus/tracking actuator shown in FIGS. 2 and 3 is better described in the commonly assigned U.S. pat. application Ser. No. 108,031 filed on Aug. 17, 1993 in the name of Boris A. Shtipelman, the subject matter of which is hereby incorporated herein by reference.

The Technical Problem

The requirement for dual motion of the objective lens in optical and magnetooptical disk drives creates a situation in which the tracking coil mass becomes an integral part of the total payload mass of the focusing motor in providing a focussing motion of the lens. Similarly, the focus coil mass is an integral part of the total payload mass of the tracking motor in providing a tracking motion of the lens. This situation neccessitates a different approach to optimizing the two motors of a two-axis optical actuators. Such optimization of motor characteristics, when the respective masses of the focus and tracking coils are required to minimize the amount of electrical power consumed, represents the technical problem addressed by this invention.

SUMMARY OF THE INVENTION

In view of the foregoing discussion, a primary object of this invention is to provide an improved focus/tracking actuator of the type described, an actuator in which the respective masses of the moving coils are optimized in order to maximize the actuator's effectiveness (i.e. speed of response) in controlling the focus and tracking position of a lens.

Like the prior art, the focus/tracking actuator of the invention comprises a pair of moving coil type linear motors, one motor being adapted to control the focus position of a lens assembly used to focus a beam of radiation on a desired data track on a moving recording element, and the other motor being adapted to control the tracking position of such lens, and each of the linear motors comprises a coil of wire disposed in a magnetic air gap and adapted to move therein in response to an applied current flow in the coils. Unlike the prior art actuators, each of the coils of the focus/tracking actuator of the invention has a mass substantially defined by the equations:

$$m_{ocf}=m_l/[(1+(1/k^2)\cdot C_{mt}/C_{mf})]$$

$$m_{oct}=m_l/[(1+k^2\cdot(C_{mf}/C_{mt}))]$$

where $m_{ocf}$ is the mass of the focus motor coil; $m_{oct}$ is the mass of the tracking motor coil; $m_l$ is the mass of the moving payload (i.e., the lens assembly and all that moves therewith, including, for example, the lens itself, the lens holder and at least a portion of the suspension used to support the lens holder for movement along two perpendicular axes); k is the ratio of the focus motor efficiency to the tracking motor efficiency; and $C_{mf}$ and $C_{mt}$ are the respective motor design parameters of the focus and tracking motors, each of said design parameters being defined by the expression, $\gamma\rho/(\beta B)^2$, where $\gamma$ is the density (kg/m³) of the wire material of the coil; $\rho$ is the resistivity of the wire material (ohm-meters); and $\beta$ is the ratio between the effective and the total length of the coil wire. Preferably, the combined masses of the focus and tracking coils equals the payload mass, and the ratio of these masses is defined as $$m_{ocf}/m_{oct}=k^2\cdot(C_{mf}/C_{mt})$$

The invention and its advantages will be better understood from the ensuing detailed description of a preferred embodiment, reference being made to the accompanying drawings in which like reference characters denote like parts.

DETAILED DESCRIPTION OF PREFERRED EMBODIMENTS

Apart from a number of physical characteristics such as overall sizes, structural integrity, and dynamic behavior, the most critical parameter of a focus or tracking actuator is the amount of force developed by its motor. Usually, this force is characterized by the force constant $K_f$, which is defined as $$K_f=l_e\cdot B \tag{1}$$

where $l_e$ is the effective length (in meters) of wire coil located in the motor air gap, and B is the magnetic flux density (in Tesla) crossing the coil in the air gap. It should be noted that for any practical application, the magnetic flux density is not uniform throughout the air gap due to a certain amount of flux leakage. Therefore, in equation (1), it is advisable to replace B by its average value of $B_{av}$.

Force constant $K_f$ is measured in Newtons per ampere and represents the motor force when 1.0 ampere of current is passing through the coil. In terms of coil mass $m_c$ and resistance $R_c$, the force constant can be defined as $$K_f=\sqrt{m_c\cdot R_c/C_m} \tag{2}$$

where $C_m$ represents a motor design parameter which characterizes the effectiveness of the magnetic structure, as well as the coil and magnet materials. This parameter has a time dimension, and it can be expressed as $$C_m=\gamma\cdot\rho/(\beta\cdot B)^2 \tag{3}$$

where $\gamma$ is the density (kg/m³) of the wire material of the coil; $\rho$ is the resistivity of the wire material (ohm-meters); and $\beta$ is the ratio between the effective $l_e$ and the total $l_w$ length of the coil wire. Such a ratio may be defined as $$\beta=l_e/l_w \tag{4}$$

It is known that the force constant $K_f$ represents an incomplete measure of a motor's performance since, for a motor coil with the established mass and overall dimensions, the value of $K_f$ (from equations (1) and (2)) can be easily boosted when the wire length, both effective $l_e$ and total $l_w$, is increased by choosing a wire with smaller cross section dimensions that subsequently increases coil resistance $R_c$. A more fundamental performance measure of the motor is provided by the effectiveness parameter $K_{ef}$ which is not a function of wire diameter or its resistance. This parameter is measured in N/√w and can be determined in the following form:

$$K_{ef}=F/\sqrt{P}=\sqrt{m_c/C_m} \tag{5}$$

where F is motor force (in Newtons) and P is the power dissipated in the coil (in watts). Here, motor force F is a function of the current I passing through the coil, or $$F=K_fI \tag{6}$$

The motor force F must be sufficient to overcome gravity and spring resistance of the suspension, and then to move the payload with a desired amount of acceleration. In other words, the value of F must exceed, or at least be equal to a combined acceleration force $$F_a=m\cdot a+F_s \tag{7}$$

where m is the total moving mass (kg); a is the combined acceleration of the moving mass (meters/sec²); and $F_s$ is the force required to overcome spring resistance of the suspension (in Newtons).

In equation (7), mass m and acceleration a can be presented by the following two expressions, respectively:

$$m=m_l+m_{cf}+m_{ct} \tag{8}$$

$$a=a_g+a_m \tag{9}$$

where $m_l$=payload mass (kg), $m_{cf}$=focus coil mass (kg), $m_{ct}$=tracking coil mass (kg), $a_g$ =gravitational acceleration equal to 9.81 meters/sec$^2$, $a_m$ =desired acceleration of mass (meters/sec$^2$).

Additionally, for a maximum stroke $\delta$ and desired natural frequency $f_n$, force $F_s$ can be expressed as $$F_s=m\cdot\delta(2\pi f_n)^2 \tag{10}$$

If value F in equation (5) is substituted by the force $F_a$ from equation (7), the motor effectiveness parameter $K_{ef}$ can be transformed to a similar parameter $$K_{af}=a/\sqrt{P}=(1/m)\sqrt{m_c/C_m} \tag{11}$$

which represents the effectiveness of the motor in terms of load acceleration per square root of power. Parameter $K_{af}$ is measured in (meters/sec$^2$)/$\sqrt{\text{watts}}$, or, if expressed in grams/$\sqrt{\text{watts}}$, $$K_{af}=[1/(9.81\ m)]\sqrt{m_c/C_m} \tag{12}$$

The structure of the above two equations indicates that the amount of power required to operate the actuator can be minimized when the efficiency parameter $K_{af}$ is maximized.

Since focus and tracking motions of the objective lens 1 in the FIG. 2 aparatus are executed by separate motors, each of them will be characterized by its own effectiveness parameter. Such values, if combined with equation (8), will have the following expressions:

$$K_{aff}=[1/(m_l+m_{cf}+m_{ct})]\sqrt{m_{cf}/C_{mf}} \tag{13}$$

for the focus motor, and $$K_{aft}=[1/(m_l+m_{cf}+m_{ct})]\sqrt{m_{ct}/C_{mt}} \tag{14}$$

for the tracking motor.

In the above equations, the design parameter $C_{mf}$ of the focus motor may differ from the design parameter $C_{mt}$ of the tracking motor when different wire materials (with their own density $\gamma$ and resistivity $\rho$) are used for the focus and tracking coils. Additionally, the effective to total wire length ratio $\beta$ may not be the same for each coil.

If the effectiveness parameters $K_{aff}$ and $K_{aft}$ for the focus and tracking motors, respectively are specified by the drive application, the required coil mass for both focus and tracking motors can be defined by combining equations (13) and (14) and solving them together. In such a case, preliminary values of the design parameters $C_{mf}$ and $C_{mt}$ have to be established in advance based upon the initial design layouts of the optical head. After simplification, the final solution results in the following focus and tracking coil masses, respectively:

$$m_{cf}=k_m\cdot(K_{aff})^2\cdot C_{mf} \tag{15}$$

$$m_{ct}=k_m\cdot(K_{aft})^2\cdot C_{mt} \tag{16}$$

where $$k_m=\frac{1-2m_l[(K_{aff})^2C_{mf}+(K_{aft})^2C_{mt}]\pm\sqrt{1-4m_l[(K_{aff})^2C_{mf}+(K_{aft})^2C_{mt}]}}{2[(K_{aff})^2C_{mf}+(K_{aft})^2C_{mt}]^2} \tag{17}$$

Analysis of the expressions for $m_{cf}$ and $m_{ct}$ allows us to make the following important statements:

1. For the required values of motor efficiencies $K_{aff}$ and $K_{aft}$ and expected design parameters $C_{mf}$ and $C_{mt}$, the respective masses of the focus and tracking coils have a real solution only when the expression under the radical in equation (17) is positive.

2. Both masses, $m_{cf}$ and $m_{ct}$, have a pair of solutions due to the plus and minus signs in front of the radical in equation (17). Therefore, it is appropriate to conclude that for a given ratio between the focus and tracking motor efficiencies there are certain values of $m_{cf}$ and $m_{ct}$ when each of the parameters $K_{aff}$ and $K_{aft}$ will be at its maximum.

3. The ratio between masses of focus and tracking coils is directly proportional to the product of ratios between squared values of motor efficiencies $K_{af}$ and design parameters $C_m$. In other words, from equations (15) and (16), $$m_{cf}/m_{ct}=(K_{aff}/K_{aft})^2\cdot(C_{mf}/C_{mt}) \tag{18}$$

or $$m_{cf}/m_{ct}=k^2(C_{mf}/C_{mt}) \tag{19}$$

where $$k=K_{aff}/K_{aft} \tag{20}$$

is the ratio between the focus and tracking motor efficiencies. In a special case, when $C_{mf}=C_{mt}$, $$m_{cf}/m_{ct}=k^2 \tag{21}$$

As stated in the first statement above, for masses $m_{cf}$ and $m_{ct}$ to have a solution, the following condition must be fulfilled:

$$1-4m_l[(K_{aff})^2C_{mf}+(K_{aft})^2C_{mt}]\geq 0$$

Therefore, with the expected design parameters $C_{mf}$ and $C_{mt}$, the required values of focus and tracking motor efficiencies are attainable only for an actuator having a payload $m_l$ which cannot be larger than $$m_{l(max)}=0.25/[(K_{aff})^2C_{mf}+(K_{aft})^2C_{mt}] \tag{22}$$

If the actual payload mass $m_l$ is larger than $m_{l(max)}$ and no appropriate changes can be implemented to decrease the value of $m_l$, the motor efficiency requirements must be lowered. To avoid an efficiency decrease, steps may be taken to enlarge the allowable maximum value of the payload mass. This can be done by forcing design parameters $C_{mf}$ and $C_{mt}$ to become smaller. As equation (3) indicates, such a change in values of $C_{mf}$ and $C_{mt}$ may be achieved by choosing materials for coil wire with smaller density and resistivity, for instance, by using aluminum instead of copper wire. For the same reason, both flux density B and the effective to total wire length ratio $\beta$ must be increased.

When the expected design parameters $C_{mf}$ and $C_{mt}$ are defined by the preliminary optical head layout and the required motor efficiencies are established by the actuator application, the focus and tracking coil masses can be optimized to maximize values of $K_{aff}$ and $K_{aft}$. This optimization assumes that the specified efficiency ratio k from equation (20) is kept constant, and the payload mass $m_l$ does not exceed its maximum allowable value $m_{l(max)}$ from equation (22).

Optimization of coil masses can be carried out by presenting motor efficiencies as two separate functions of either $m_{cf}$ for $m_{ct}$, and then solving expressions for partial derivatives of $K_{aff}$ and $K_{aft}$ with respect to each mass. In such a case, with the ratio between masses $m_{cf}$ and $m_{ct}$ from equation (19), equations (13) and (14) can be rewritten as $$K_{aff} = f_1(m_{cf}) = (\sqrt{m_{cf}/C_{mf}})\ /\{m_l + m_{cf}[1 + (1/k^2) \cdot C_{mt}/C_{mf}]\} \quad (23)$$

$$K_{aft} = f_1(m_{ct}) = (\sqrt{m_{ct}/C_{mt}})\ /\{m_l + m_{ct}[1 + (1/k^2) \cdot C_{mf}/C_{mt}]\} \quad (24)$$

Therefore, when simplified and solved for values of focus and tracking masses, the following two equations $$\partial K_{aff}/\partial m_{cf} = 0$$

$$\partial K_{aft}/\partial m_{ct} = 0$$

will result in mass values equal to $$m_{ocf} = m_l/[1 + (1/k^2) \cdot (C_m/C_{mf})] \quad (25)$$

$$m_{oct} = m_l/[1 + k^2 \cdot (C_m/C_{mt})] \quad (26)$$

In the special case where $C_{mf} = C_{mt}$, $$m_{ocf} = m_l/(1 + 1/k^2) \quad (27)$$

$$m_{oct} = m_l/(1 + k^2) \quad (28)$$

Figure 4:
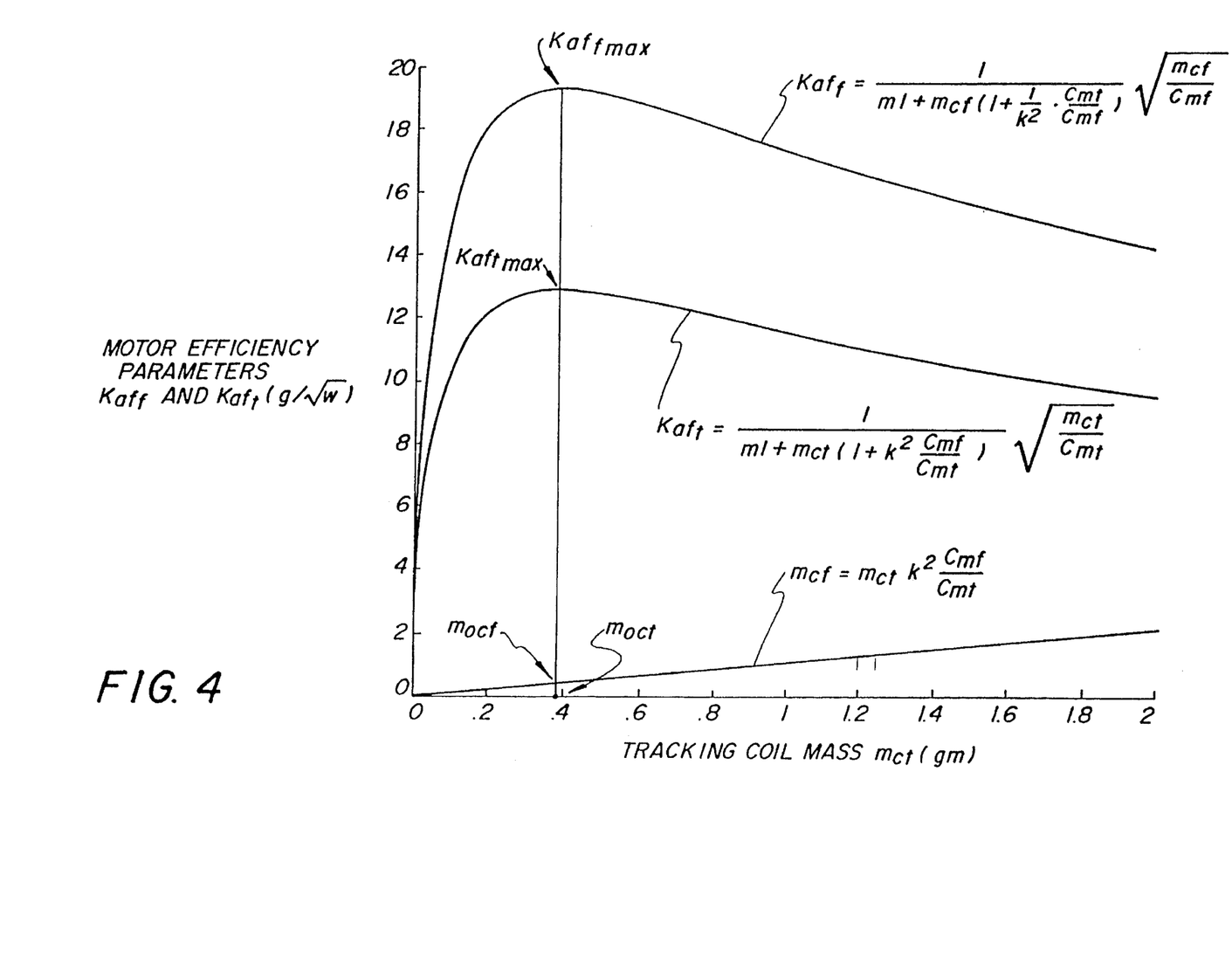
FIGS. 4–7 are a series of graphs illustrating various relationships between coil masses and motor efficiency parameters.

In the equations above, the obtained values of focus and tracking coil masses are denoted by a new subscript "oc" to indicate that both coils are optimized to maximize efficiency parameters of each motor. The latter can be easily demonstrated by differentiating equations (23) and (24) twice and showing that the resulting values are negative. The fact that motor efficiencies have maximum values can also be illustrated graphically by plotting $K_{aff}$ and $K_{aft}$ as a function of the coil mass. In FIG. 4, such graphs are presented for an actuator with the following design parameters:

$m_l = 0.8$ gm $k = 1.5$ $C_{mf} = 4.5$ ms $C_{mt} = 9.5$ ms

As seen in FIG. 4, when the ratio between focus and tracking coil masses is specified by equation (19), maximum values of efficiency parameters are equal to 19.29 and 12.86 grams per square-root of power (watts) for the focus and tracking motors, respectively. For such a case, these parameters can be achieved with coils in each motor having respective masses of 0.413 and 0.387 gm.

In FIG. 4, it is apparent that the graph slopes in the area of maximum motor efficiencies are gentle enough to provide a wide tolerance in determining masses of focus and tracking coils due to certain manufacturing deviations in coil sizes, number of turns, wire diameter, etc. For instance, for an optimized focus coil mass but with a tracking coil mass different from its optimized value, motor efficiency parameters will be computed by equations (13) and (14) as $$K'_{aff} = [1/(m_l + m_{ocf} + m_{ct})] \cdot \sqrt{m_{ocf}/C_{mf}}$$

$$K'_{aft} = [1/(m_l + m_{ocf} + m_{ct})] \cdot \sqrt{m_{ct}/C_{mt}}$$

Figure 5:
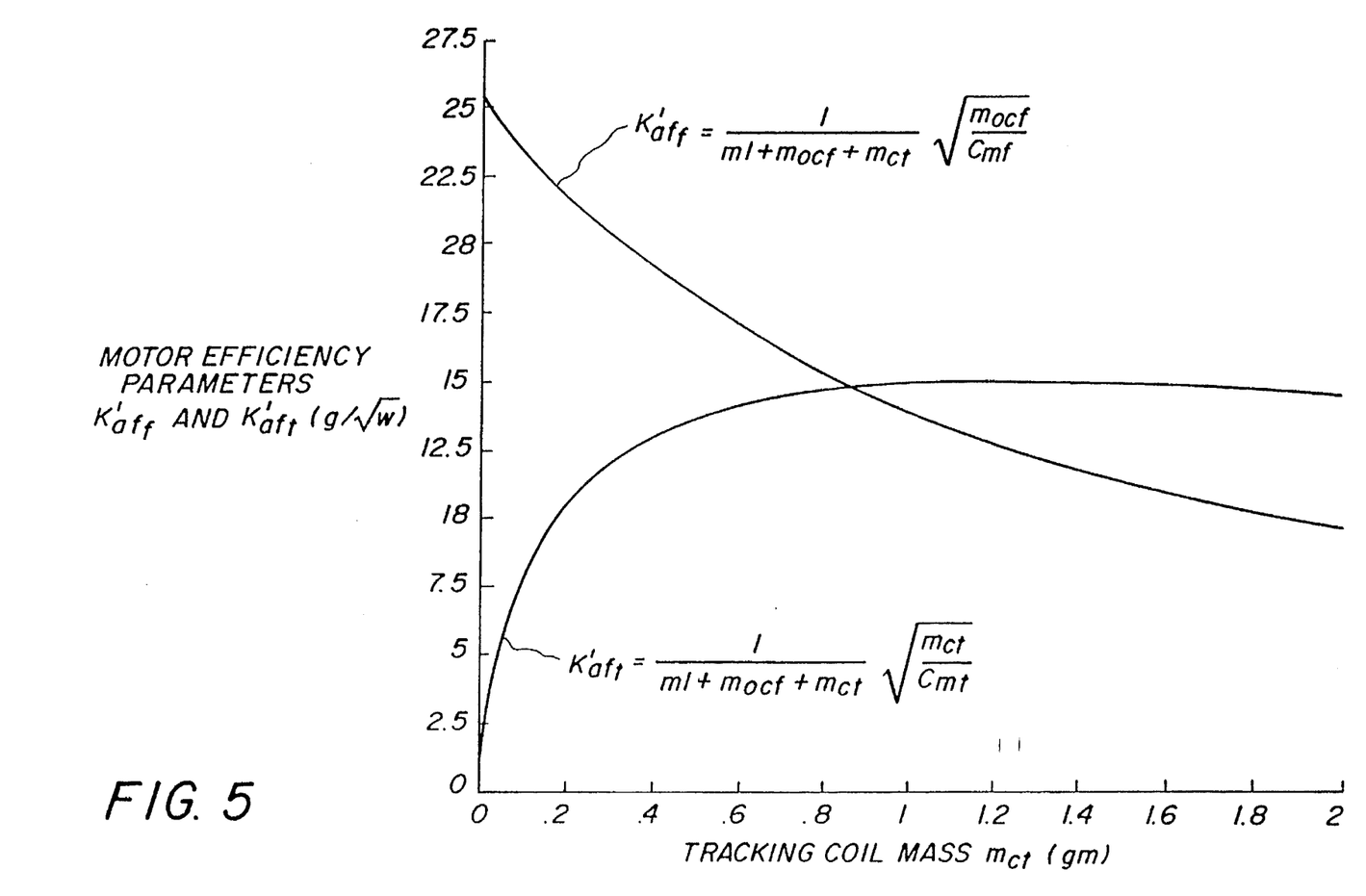
Figure 6:
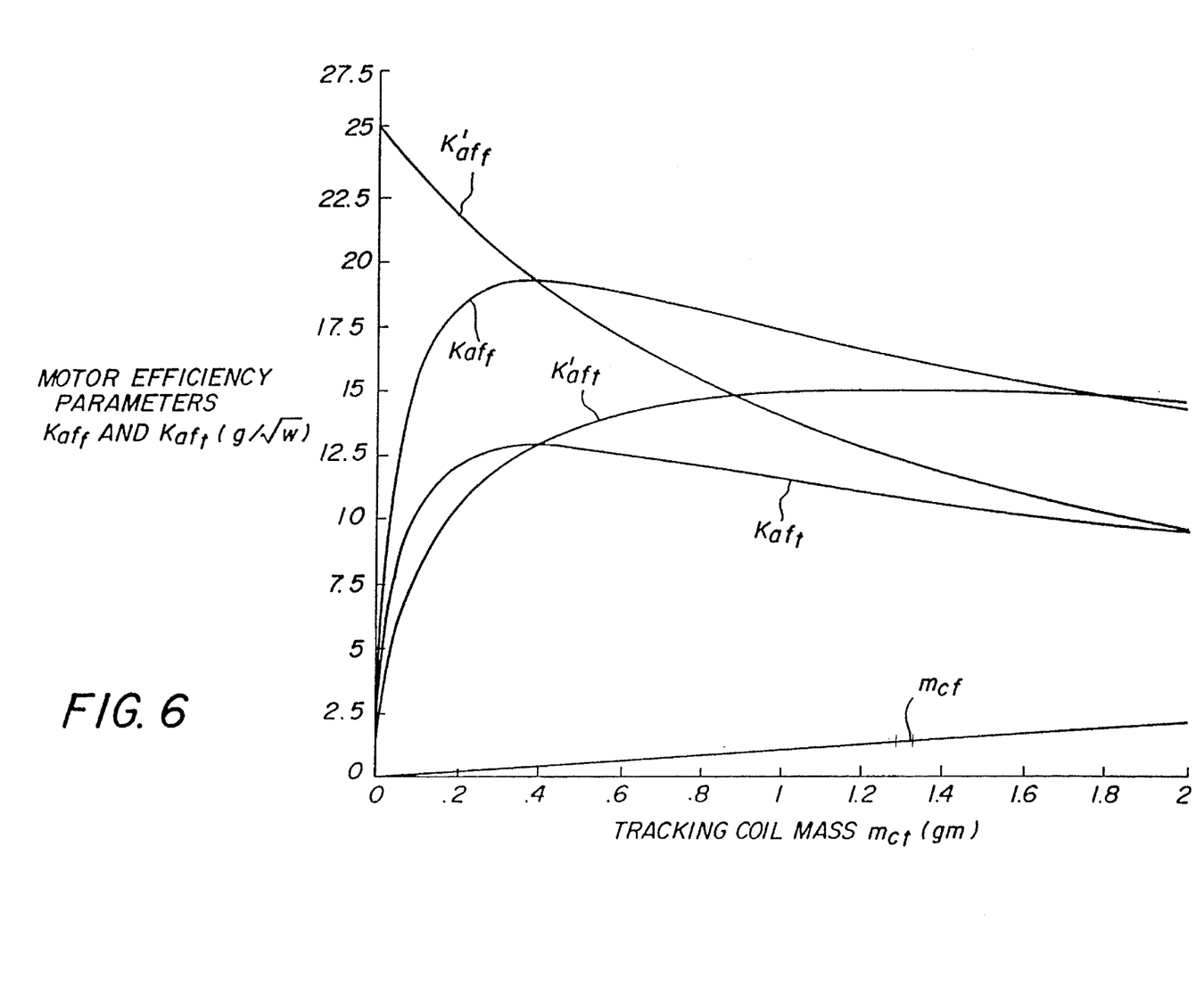
Figure 7:
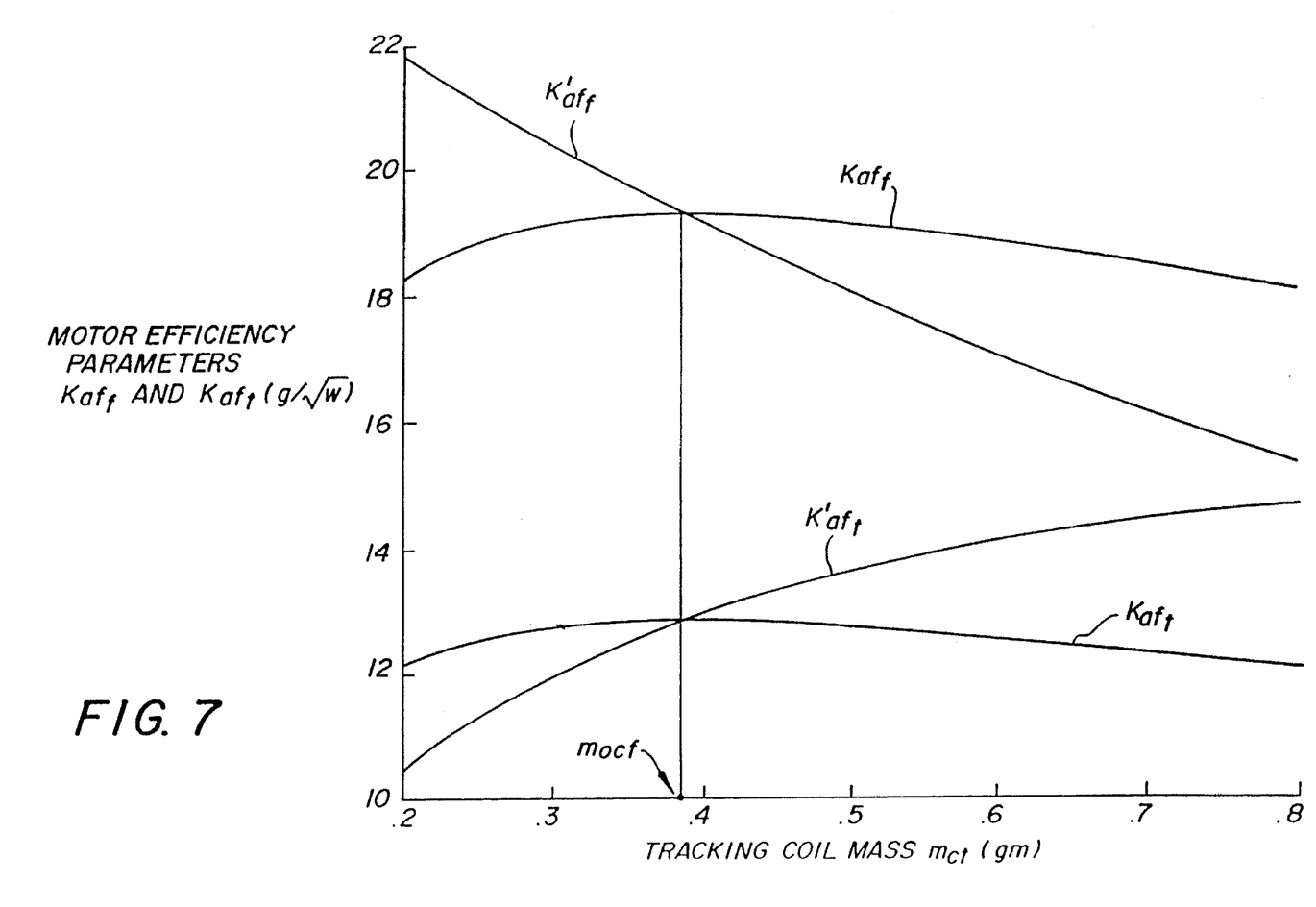

For $m_{ocf} = 0.413$ gm, values $K'_{aff}$ and $K'_{aft}$ are plotted in FIG. 5 as a function of $m_{ct}$. These graphs, combined with graphs from FIG. 4, are presented in FIG. 6. A fragment of this figure, illustrated in a larger scale and taken in the area of maximum motor efficiencies, is shown in FIG. 7. The latter indicates that, for an optimized tracking coil with a mass of $m_{ct} = 0.387$ gm, a ±25% change in this value from 0.3 to 0.5 gm will result in motor efficiency changes less than ±7%.

Although optimized masses $m_{ocf}$ and $m_{oct}$ from equations (25) and (26) are characterized by the same ratio as defined in equation (19), their individual values are different from the ones in equations (15) and (16). However, if $m_{ocf}$ and $m_{oct}$ are added together, the following simplified expression can be written:

$$m_l = m_{ocf} + m_{oct} \quad (29)$$

This equation is very significant since it points to a clear design direction, namely: for maximum efficiencies of both motors, the respective masses of the focus and tracking coils must be characterized by a ratio from equation (19) with their combined value equal to the mass of the payload.

With optimized coil masses, equations (13) and (14) for maximized values of motor efficiencies can be easily simplified to the following expressions:

$$K_{aff(max)} = (1/2\ ml) \sqrt{m_{ocf}/C_{mf}} \quad (30)$$

$$K_{aft(max)} = (1/2\ ml) \sqrt{m_{oct}/C_{mt}} \quad (31)$$

These parameters, if substituted for values $K_{aff}$ and $K_{aft}$ in equation (22), define the allowable value of $m_{l(max)}$ as being equal to $m_l$. In other words, for focus and tracking motors with maximum efficiencies, the payload mass $m_l$ represents its maximum allowable value which guarantees the existence of the solution for coil masses in each motor.

For a given design application, it is logical to assume that the payload mass $m_l$ and ratio k between the desired efficiency parameters of the focus and tracking motors are specified. If the preliminary design parameters $C_m$ for each motor are also determined, in other words, when magnetic flux density B and coil material ($\gamma$ and $\rho$) and sizes (such as $\beta$) are established, optimized coil masses in equations (30) and (31) can be easily excluded as variables in determining maximum values of motor efficiencies. To present these maximum values as a function of design characteristics only, optimized coil masses in equations (30) and (31) have to be substituted with their respective values from equtions (25) and (26). After simplification, this substitution results in $$K_{aff(max)} = 0.5\ k \sqrt{(1/m_l) \cdot [1/(k^2 C_{mf} + C_{mt})]} \quad (32)$$

$$K_{aft(max)} = 0.5 \sqrt{(1/m_l) \cdot [1/(k^2 C_{mf} + C_{mt})]} \quad (33)$$

or, for the special case when $C_{mf} = C_{mt} = C_m$, $$K_{aff(max)} = 0.5\ k \sqrt{(1/m_l C_m) \cdot [1/(1 + k^2)]} \quad (34)$$

$$K_{aft(max)} = 0.5 \sqrt{(1/m_l C_m) \cdot [1/(1 + k^2)]} \quad (35)$$

Furthermore, if in this special case the focus and tracking motors have the same efficiencies, in other words, for a ratio $k = 1$, the maximum efficiency parameters for each motor will have values equal to $$K_{aff(max)} = K_{aft(max)} = K_{af(max)} = 0.5 \sqrt{1/(2\ m_l \cdot C_m)} \quad (36)$$

or, combined with equations (8) and (9), $$K_{af(max)} = 0.5 \sqrt{1/(m \cdot C_m)} \quad (37)$$

For such a special case, when $C_{mf} = C_{mt} = C_m$ and $k = 1.0$, the total moving mass of the focus/tracking actuator is equal to $m=2$ $m_f=4$ $m_c$, where $m_c$ is the mass of either focus or tracking coils. With it, equation (37) can be easily transformed into the form expressed by equation (11).

In view of the foregoing analysis, the following conclusions can be drawn:

1. When motor efficiency parameters have maximum values defined by equations (32) and (33), the actuator lens acceleration in either focus or tracking direction will require the minimum amount of power. For a majority of applications, this represents the most desirable design optimization. Therefore, for an actuator with established values of $m_l$, k, $C_{mf}$ and $C_{mt}$, maximum motor efficiencies from equations (32) and (33) will be guaranteed with focus and tracking coil masses characterized by the optimized values $m_{ocf}$ and $m_{oct}$ from equations (25) and (26), respectively. In such a case, their combined mass will be equal to the payload mass $m_l$.

2. If the achievable values of $K_{aff(max)}$ and $K_{aft(max)}$ are smaller than the required efficiency parameters, the overall design of the actuator has to be reviewed in order to lower the payload mass $m_l$ or steps must be taken to decrease design parameters $C_{mf}$ and $C_{mt}$ (e.g., by enlarging $\beta$ and B, and choosing materials with smaller $\gamma$ and $\rho$.

3. If maximum motor efficiencies $K_{aff(max)}$ and $K_{aft(max)}$ exceed the required values of $K_{aff}$ and $K_{aft}$, the coil masses can be chosen within a range of values allowing one to trade off motor efficiencies for other factors, such as mass distribution, coil thicknesses, manufacturing cost, etc.

While the invention has been described with reference to a preferred embodiment, it will be appreciated that certain modifications may be made without departing from the spirit and scope of the invention. Such modifications are intended to fall within the scope of the appended claims.

What is claimed is:

1. A focus/tracking actuator for controlling the respective focus and tracking positions of a movably mounted lens assembly used to direct a focused beam of radiation onto a desired data track on a moving recording element, said focus/tracking actuator comprising a pair of moving coil type linear motors, one of said motors being adapted to control the focus position of said lens assembly, and the other of said motors being adapted to control the tracking position of said lens assembly, each of said focus and tracking controlling motors comprising a coil of wire disposed in a magnetic air gap and adapted to move therein in response to an applied current flow in said coils, each of said coils having a mass substantially defined by the equations:

$$m_{ocf} = m_l/[1+(1/k^2)(C_{mt}/C_{mf})]$$

$$m_{oct} = m_l/[1+k^2(C_{mf}/C_{mt})],$$

where $m_{ocf}$ is the mass of the focus motor coil; $m_{oct}$ is the mass of the tracking motor coil; $m_l$ is the mass of the movably mounted lens assembly; k is the ratio of the focus motor efficiency to the tracking motor efficiency; and $C_{mf}$ and $C_{mt}$ are the respective motor design parameters defined by the expression $$\gamma \rho/(\beta B)^2,$$

where $\gamma$ is the density (kg/m³) of the wire material of the coil; $\rho$ is the resistivity of the wire material (ohm-meters); $\beta$ is the ratio between the effective and the total length of the coil wire, and B is the magnetic flux (Tesla) crossing the wire.

2. The apparatus as defined by claim 1 wherein the mass of the lens assembly is substantially equal to the combined masses of the focus and tracking motor coils.

3. The apparatus as defined by claim 2 wherein the focus and tracking motor efficiencies, $K_{aff}$ and $K_{aft}$, are defined by $$K_{aff} = (1/2m_l) \cdot \sqrt{m_{ocf}/C_{mf}},$$

and $$K_{aft} = (1/2m_l) \cdot \sqrt{m_{ct}/C_{mt}}.$$

4. The apparatus as defined by claim 3 wherein the ratio of the focus coil mass to the tracking coil mass, $m_{ocf}/m_{oct}$ is proportional to the square of the ratio of the focus motor efficiency to the tracking motor efficiency, $(K_{aff}/K_{aft})^2$, multiplied by the ratio of the focus and tracking motor design parameters, $C_{mf}/C_{mt}$.

5. The apparatus as defined by claim 1 wherein k is defined as $$k = K_{aff}/K_{aft} = \sqrt{m_{cf}/m_{ct} \cdot (C_{mt}/C_{mf})},$$

where $K_{aff}$ and $K_{aft}$ are defined as $F/m\sqrt{P}$, where m is the combined mass of the lens assembly, and focus and tracking coils, F is the product of the motor force constant and the maximum coil current provided by a coil-driving circuit, and P is the maximum coil current provided by a coil-driving circuit multiplied by the squared value of the coil resistance.

6. A focus/tracking actuator for controlling the respective focus and tracking positions of a lens assembly mounted on a movable support and used to direct a focused beam of radiation onto a desired data track on a moving recording element, said focus/tracking actuator comprising a pair of moving coil type linear motors, one of said motors being adapted to control the focus position of said lens assembly, and the other of said motors being adapted to control the tracking position of said lens, each of said focus and tracking controlling motors comprising a coil of wire disposed in a magnetic air gap and adapted to move therein in response to an applied current flow in said coils, said coils having a combined mass substantially equal to the mass of said lens assembly and said movable support.

* * * * *